(12) United States Patent
Sun et al.

(10) Patent No.: US 11,579,299 B2
(45) Date of Patent: Feb. 14, 2023

(54) 3D RANGE IMAGING METHOD USING OPTICAL PHASED ARRAY AND PHOTO SENSOR ARRAY

(71) Applicant: Litexel Inc., West Covina, CA (US)

(72) Inventors: Xiaochen Sun, Chino Hills, CA (US); Ningning Feng, Acadia, CA (US)

(73) Assignee: Litexel Inc., West Covina, CA (US)

( * ) Notice: Subject to any disclaimer, the term of this patent is extended or adjusted under 35 U.S.C. 154(b) by 988 days.

(21) Appl. No.: 16/372,758

(22) Filed: Apr. 2, 2019

(65) Prior Publication Data

US 2020/0319340 A1 Oct. 8, 2020

(51) Int. Cl.
| | |
|---|---|
| *G01C 3/08* | (2006.01) |
| *G01S 17/89* | (2020.01) |
| *G01S 7/481* | (2006.01) |
| *G01S 17/32* | (2020.01) |

(52) U.S. Cl.
CPC ............ *G01S 17/89* (2013.01); *G01S 7/4815* (2013.01); *G01S 17/32* (2013.01)

(58) Field of Classification Search
CPC ........ G01S 17/89; G01S 7/4815; G01S 17/32; G01S 17/46
See application file for complete search history.

(56) References Cited

U.S. PATENT DOCUMENTS

| | | | |
|---|---|---|---|
| 3,781,552 A | 12/1973 | Kadrmas | |
| 5,210,586 A | 5/1993 | Grage et al. | |
| 5,682,229 A | 10/1997 | Wangler | |
| 6,891,987 B2 | 5/2005 | Ionov et al. | |
| 7,969,558 B2 | 6/2011 | Hall | |
| 8,125,367 B2 | 2/2012 | Ludwig | |
| 8,675,181 B2 | 3/2014 | Hall | |
| 8,767,190 B2 | 7/2014 | Hall | |
| 9,753,351 B2 | 9/2017 | Eldada | |
| 9,964,833 B2 | 5/2018 | Eldada | |
| 9,983,297 B2 | 5/2018 | Hall et al. | |
| 2014/0239073 A1* | 8/2014 | Toyoda | G06K 7/10712 235/462.24 |
| 2018/0113200 A1* | 4/2018 | Steinberg | G01S 17/89 |
| 2019/0227175 A1* | 7/2019 | Steinberg | G01S 17/93 |

* cited by examiner

*Primary Examiner* — Samantha K Nickerson
(74) *Attorney, Agent, or Firm* — Chen Yoshimura LLP

(57) ABSTRACT

A 3D range imaging method using a LiDAR system includes sequentially generating multiple far field patterns to illuminate a target scene, each far field pattern including a plurality of light spots where each spot illuminates only a segment of a scene region unit that corresponds to a sensor pixel of the LiDAR receiver. Within each scene region unit, the multiple segments illuminated in different rounds are non-overlapping with each other, and they collectively cover the entire scene region unit or a part thereof. With each round of illumination, the signal light reflected from the scene is detected by the sensor pixels, and processed to calculate the depth of the illuminated segments. The calculation may take into consideration optical aberration which causes reflected light from an edge segment to be received by two sensor pixels. The depth data calculated from the sequential illuminations are combined to form a ranged image.

19 Claims, 9 Drawing Sheets

3D RANGE IMAGING METHOD USING OPTICAL PHASED ARRAY AND PHOTO SENSOR ARRAY

BACKGROUND OF THE INVENTION

Field of the Invention

The invention relates to a three-dimension (3D) range (depth) imaging method that uses a system including an optical phased array (OPA), a photo sensor (receiver) and other components.

Description of Related Art

Radio wave phased arrays play important roles in modern communication, ranging and astronomy. Based on the same physics but a drastically different frequency range, chip scale optical phased array (OPA) has lately been drawing increasing attention for a wide range of applications from autonomous vehicle LiDAR (light detection and ranging), to free-space communication, to image projection. An optical phased array device is generally made of many antenna units which are arranged in one- or two-dimensional array and are individually or group tunable in phase and sometimes amplitude in order to form a specific output beam pattern through interference effect.

On-chip or chip-scale optical phased array devices often rely on photonic waveguides to transmit and distribute light to an array of photonic antennas. The photonic waveguides can be made on chip with many optical material systems such as silicon-on-insulator, doped silica, silicon nitride, indium phosphide, lithium niobate and etc. The use of waveguide and the CMOS like Si processing capability can significantly increase the complexity i.e. the number of the antennas (and associated phase tuning elements) therefore a large scale OPA can be practically realized and maybe commercialized.

Range imaging of a target scene requires distance measurement and mapping the whole scene. There are commonly two methods of accomplishing such task and they are sometimes called scanning LiDAR and flash LiDAR respectively. A scanning LiDAR is to steer a point light source (or a narrow collimated beam) and scan the scene while measuring the reflected light of each illuminated region for distance calculation via a variety of direct (by time measurement) or indirect (by phase or frequency measurement) time-of-flight schemes. The light signal, usually modulated according to a distance calculation scheme, can be steered via a mechanically rotating setup, a microelectromechanical (MEMS) movable mirror, or an OPA. A flash LiDAR is to illuminate the whole scene with signal light and use an imaging system on the receiver side to image the scene on a distance measurement pixel array in which each pixel measures the average distance of the corresponding region of the scene. The former method can produce very fine scene-mapping resolution with narrowly diverged light beam while it suffers from low frame rate as each point is measured individually with certain required integration time. The latter method can enable high frame rate due to possible one-time measurement at all pixels or at least one row of pixels at a time while it suffers from limited scene-mapping resolution especially for long distance targets because the distance measurement pixel is generally more complex than a RGB camera pixel, it is difficult to scale its size to make very high pixel count. Another drawback is that with larger pixel array size in a preferable compact optical lens system, it's difficult to avoid optical aberrations which produce incorrect distance results.

The limitation in frame rate for the scanning LiDAR has been partially addressed by adding more pairs of light sources and detector which are arranged to point to different angles from the rotation plane that the one direction (or field of view) scanning occurs. An example of such system is described in U.S. Pat. No. 9,983,297 B2. However, such design is not scalable in terms of both cost and system complexity as the number of the scanning points or the resolution is scaled with the number of pairs of individual lasers and receivers. Others may use multiple OPA chips or devices like the one described in U.S. Pat. No. 9,753,351 B2 and combine them to realize scanning in two directions (or two fields of view).

SUMMARY

Using the systems described in the above-referenced U.S. patents, if multiple OPAs are arranged to emit light to different angles from the rotation plane that the one dimension (or field of view) phased array scanning occurs, it encounters the similar limitation as the one described earlier. If multiple OPAs are sequentially connected in order to scan the emitted light in two dimensions (or fields or views), the optical path interconnect design from the output of a first OPA to the input of a second OPA can be very complicated as the output light of the first OPA changes directions which cannot be easily coupled into the usually fixed input of the second OPA therefore most likely at least one moving component is required or other types of free-space scanning approach is adopted. This sequentially connected OPAs scheme, although mentioned in both of the above-referenced U.S. patents, is not clearly explained in the implementation of above mentioned optical coupling between two OPAs.

The method according to embodiments of the present invention takes advantage of the unique feature of a large scale OPA which can simultaneously produce and steer multiple light beams with designed directions, and combine it with a photo sensor array, to produce finer range imaging resolution as well as to reduce the negative effect of optical aberrations while maintaining high frame rates.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory and are intended to provide further explanation of the invention as claimed.

DETAILED DESCRIPTION OF PREFERRED EMBODIMENTS

Figure 1:
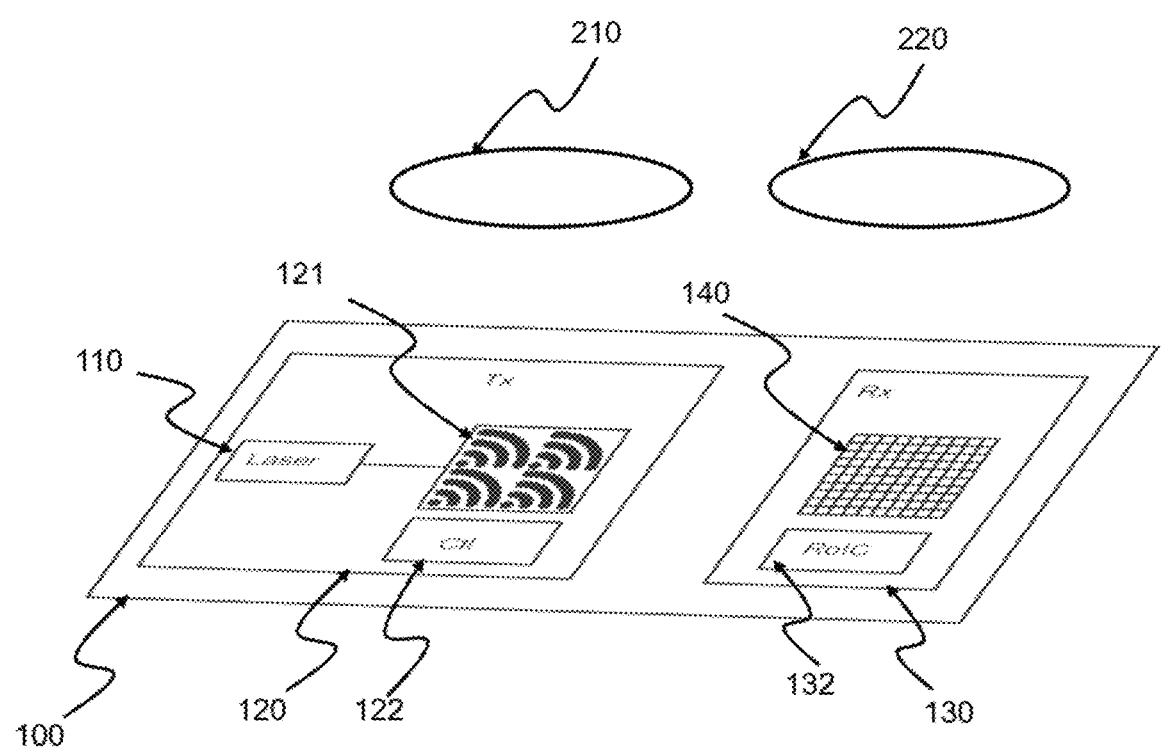
FIG. 1 is a schematic illustration of a LiDAR system which may be used to implement a 3D range imaging method according to embodiments of the present invention.

FIG. 1 schematically illustrates a light detection and ranging (LiDAR) system which may be used to implement a 3D range imaging method according to embodiments of the present invention. The system includes a platform 100, which includes a transmitter 120 and a receiver 130; some optical lens systems 210 and 220; and some mechanical and interfacing structures that are not shown in the figure as they are not directly related to the presented range imaging method.

The transmitter 120 includes at least one light source 110, including but not limited to, a semiconductor laser, a solid-state laser, or a fiber laser; at least one OPA 121 in the form of a bare-die chip or a pre-packaged device made from photonic integrated circuits (such as Si photonics circuits or InP photonics circuits) or discrete optical components; one or a plurality of control integrated circuits 122 which can be a part of the OPA chip or standalone chips; and any optical components (not shown) to couple light from the light source 110 to the OPA 121 and any physical structures (not shown) to hold the components together.

Figure 2:
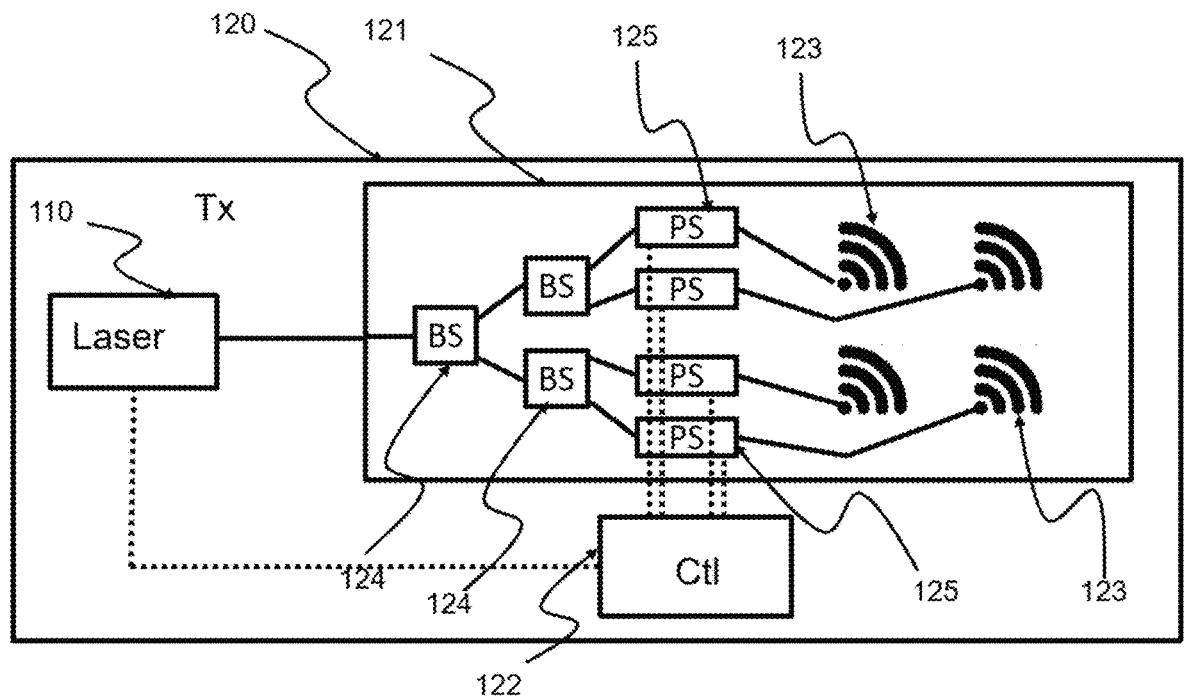
FIG. 2 is a schematic description of an OPA.

The OPA 121, as shown in FIG. 2, includes a plurality of antennas 123 which emit light with divergent angles in one or two dimensions (fields of view); a plurality of optical splitters 124 that split the input light into a plurality of branches to feed the antennas; and a plurality of phase shifting and amplitude tuning elements 125 each coupled to one antenna 123. The phase shifting and amplitude tuning elements can be achieved by a variety of devices including but not limited to thermo-optic effect, electro-refractive effect, electro-absorption effect, free-carrier absorption effect, phase changing effect and liquid crystal actuation. The antennas may include one or more of: optical waveguide facets, grating couplers, reflectors, meta-surface couplers, and holographic optical couplers. The optical splitters may include one or more of: Y-junctions, multi-mode interferometers, directional couplers, and thin-film semi-transparent reflectors.

The control circuits 122 are used to supply power and control the operation of the light source 110 and the phase shifting and amplitude tuning elements 125 as well as to provide input/output (I/O) functions.

By controlling and adjusting the phase shifting and amplitude tuning elements 125, the light emitted from the array of antennas 123 can form arbitrary far field patterns including but not limited to: a single optical beam or spot, a 1D array of spots or lines with evenly or unevenly angular spacing between them, a 2D array of spots with evenly or unevenly angular spacing between them. The accuracy of a far field optical pattern to the designed pattern depends on the number of antennas in an OPA as well as the design of the antenna array including the structures of the antennas and the distances and arrangement among them.

The receiver 130 includes a photo sensor array 140 in the form of bare-die chip or pre-packaged device which is composed of a 1D or 2D array of at least one photo sensitive pixels, and a read-out integrated circuits 132 which can be a part of the sensor array chip or a standalone chip. The read-out circuits 132 are used to read photo-generated current or voltage signal, amplify the signal and calculate the distance values of all sensor pixels and to provide control and I/O functions.

The optical lens system 210 includes at least one optical lens and optionally other optical components such as filters and polarizers. The optical lens system 210 is used to shape the output light of the OPA 121 for better collimation or divergence properties the application requests. The optical lens system 210 can be omitted in some applications.

The optical lens system 220 includes at least one optical lens and optionally other optical components such as filters and polarizers. The optical lens system 220 is used to image the target scene illuminated by the output light of the OPA 121 on to the photo sensor array 140. The optical lens system 210 preferably includes multiple optical lenses with different materials or designs in order to reduce optical aberrations.

Figure 3A:
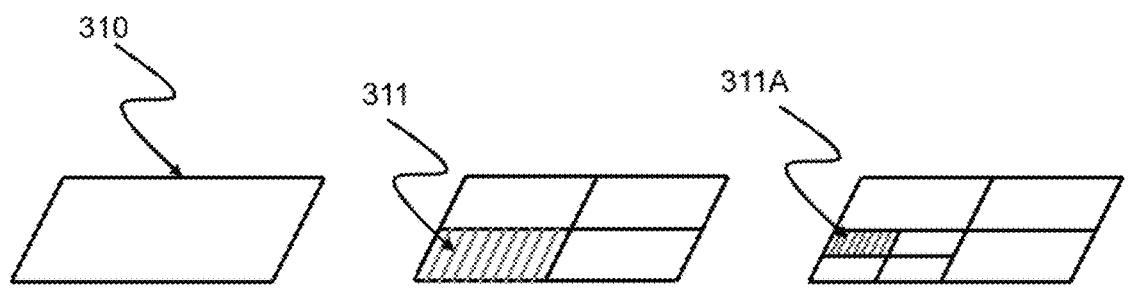
FIGS. 3A, 3B and 3C schematically illustrates a 3D range imaging method with increased mapping solution according to a first embodiment of the present invention.
Figure 3B:
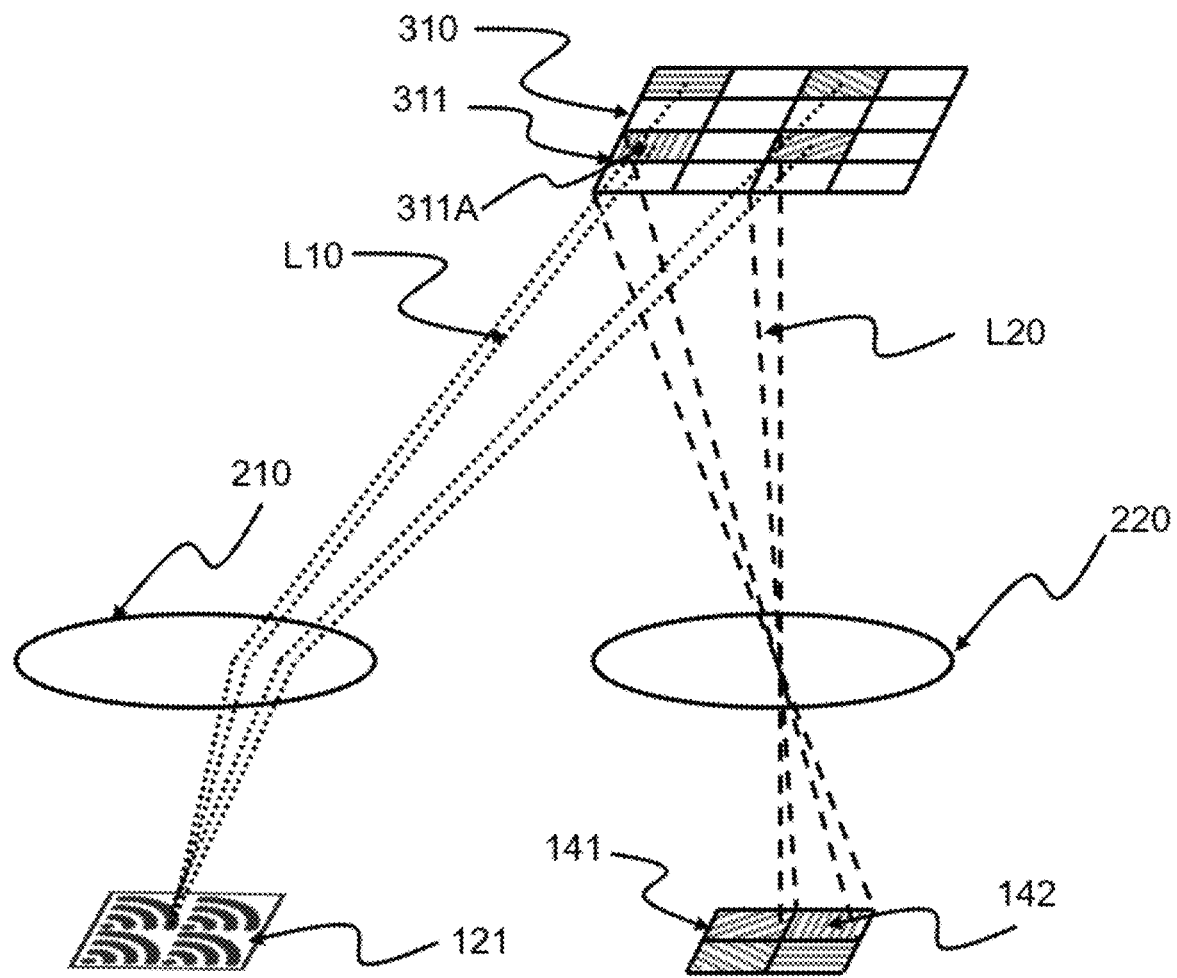

A method of accomplishing 3D range/depth imaging using the LiDAR system in FIG. 1 is described with reference to FIGS. 3A and 3B. By controlling the phase shifting and amplitude tuning elements 125, the OPA 121 can simultaneously emit an array of optical beams at designated directions, so as to produce an array of light spots at designated locations of a target scene. The optical beam (and correspondingly, the light spots) can be distributed evenly or unevenly in angle (and correspondingly, distance between light spots) depending on system design. The example shown in FIGS. 3A and 3B presents an evenly spaced optical beam array L10 (in dotted line). It should be noted that for simplicity only 4 optical beams are drawn in FIGS. 3A and 3B but the number of the optical beams is not limited to a certain value.

Figure 3C:
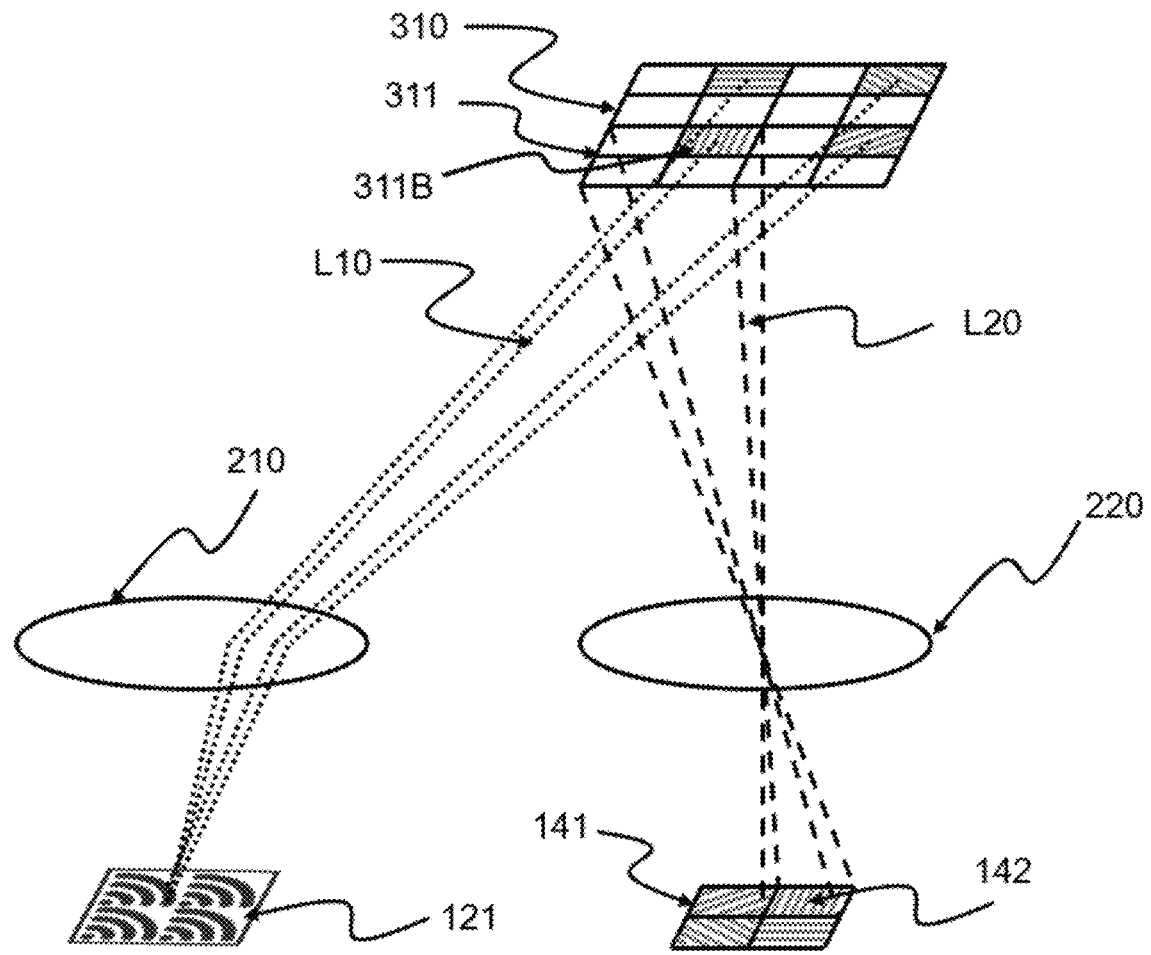

Each optical beam is designed to illuminate a segment of the scene region unit that corresponds to the imaging area of a single pixel. In the example in FIGS. 3A, 3B and 3C, a photo sensor pixel array's segment 141 comprises 4 pixels that image a scene region 310. The rectangular scene region unit 311 imaged by a rectangular pixel 142 is indicated by 4 dashed lines L20 connecting its 4 corners to the pixel 142's 4 corners via lens system 220's principal point. And within this rectangular scene region unit 311, only a ¼ segment 311A is illuminated by one of the optical beams L10, therefore the averaged distance of only this segment 310A is measured by the pixel 142, although a 4 times larger region (the scene region unit 311) is capable of being imaged by the pixel 142. When the distance calculation is completed, the phase shifting and amplitude tuning elements 125 of the OPA are adjusted to rotate the beam to illuminate another segment 311B of each imaged scene region unit 311, and the measurement by the pixel 142 and the distance calculation is repeated as shown in FIG. 3C. The same process occurs simultaneous at the multiple scene region units 311 imaged respectively by multiple pixels, although for simplicity only 4 pixels are drawn in FIGS. 3B and 3C. Each scene region unit 311 is divided by a pre-determined number of segments (e.g. 4 segments in the case in FIGS. 3A, 3B and 3C). By sequentially scanning the multiple segments 311A, 311B etc. (e.g. 4 times in the case in FIGS. 3A, 3B and 3C), the effective range imaging spatial resolution of the scene is effectively increased by a fold of the same number (e.g. 4 times in the case in FIGS. 3A, 3B and 3C). And it is a scalable and flexible solution as one can re-use the same pixel array size and adjust phase shifting and amplitude tuning elements 125 to make different sizes of the spot (i.e.

segment), so as to adjust the spatial resolution of the range imaging system without modifying the hardware of the system.

Figure 5:
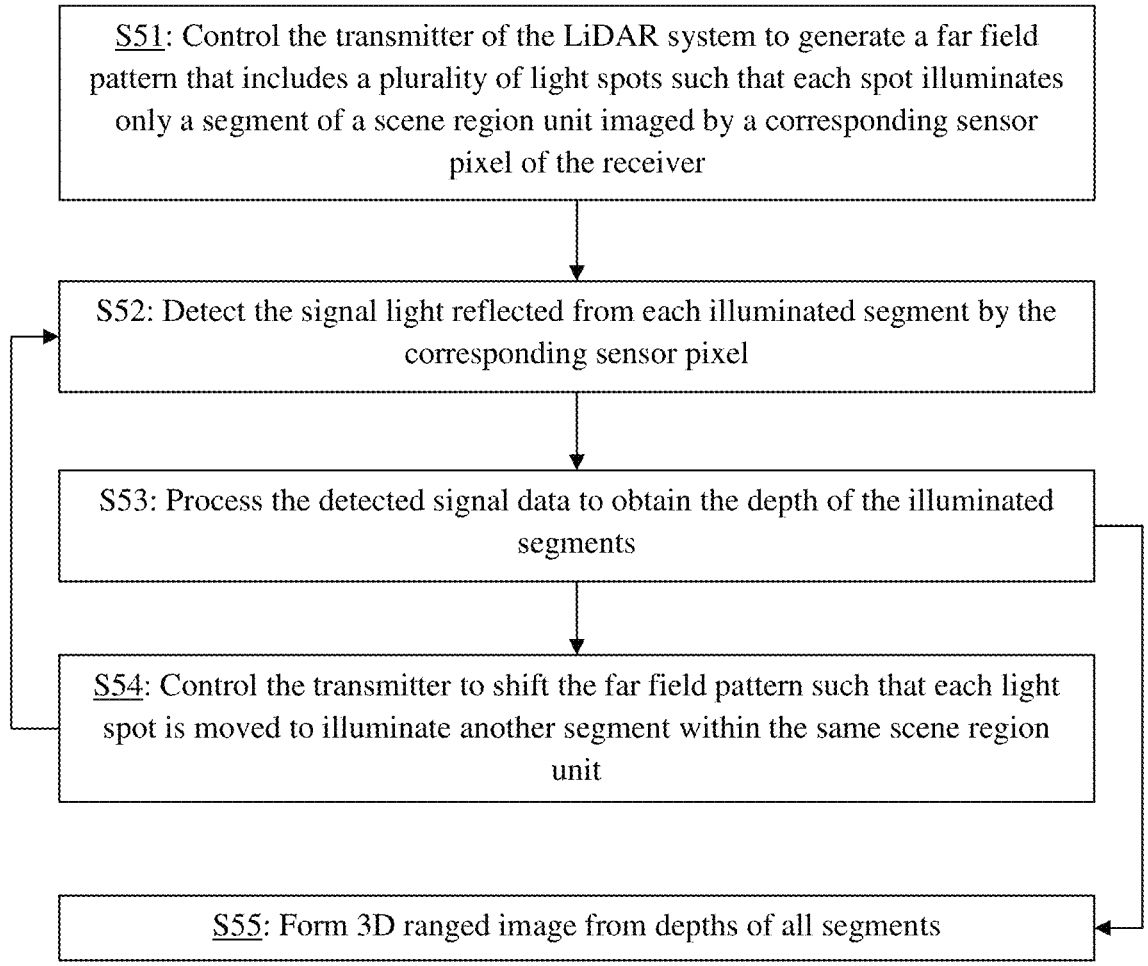
FIG. 5 schematically illustrates steps of a 3D range imaging method according to the first embodiment of the present invention.

To summarize, the method according to a first embodiment of the present invention includes the following steps (FIG. 5). First, the transmitter of the LiDAR system is controlled to generate a far field pattern that includes a plurality of light spots where each spot illuminates only a segment of a scene region unit imaged by a corresponding sensor pixel of the receiver (step S51). The signal light reflected from each illuminated segment is detected by the corresponding sensor pixel (step S52). The detected signal data is processed to obtain the depth (i.e. distance) of the illuminated segments (step S53). Then, the transmitter of the LiDAR system is controlled to rotate the far field pattern where each light spot is moved to illuminate another segment within the same scene region unit (step S54). The detection step S52 and the data processing step S53 are performed to obtain the depth of the new illuminated segments. Steps S54, S52 and S53 are repeated to sequentially illuminate multiple segments within each scene region unit. The multiple illuminated segments within each scene region unit are preferably non-overlapping with each other, and collectively cover the entire scene region unit or a part of the scene region unit. The depth data generated by sequentially illuminating the multiple segments form a ranged image of the target scene (step S55). Such an image has a higher spatial resolution compared with a ranged image obtained by using the same LiDAR system but illuminating the entire scene region unit at once.

Figure 4A:
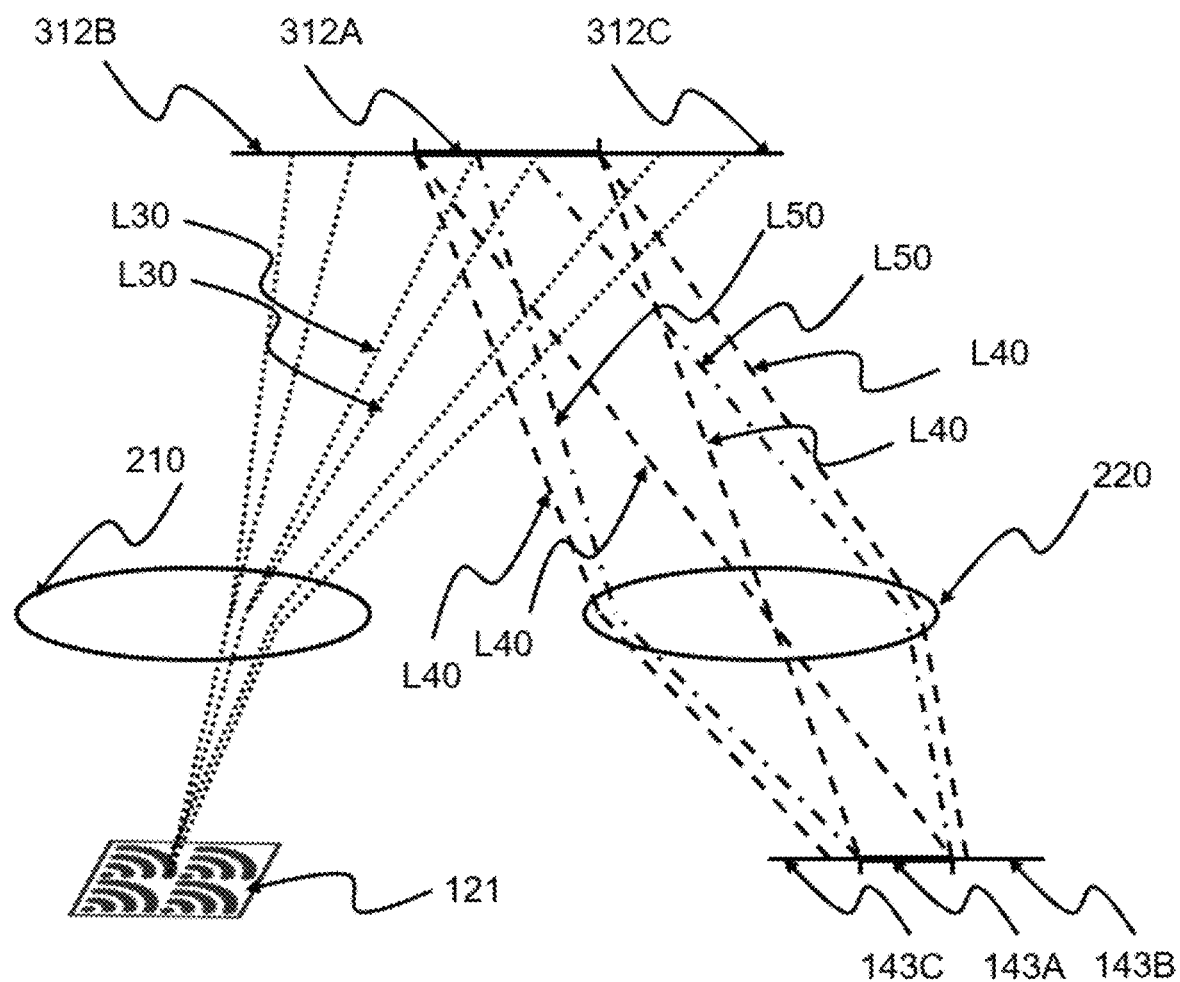
FIGS. 4A and 4B schematically illustrates a 3D range imaging method with reduced optical aberrations according to a second embodiment of the present invention.
Figure 4B:
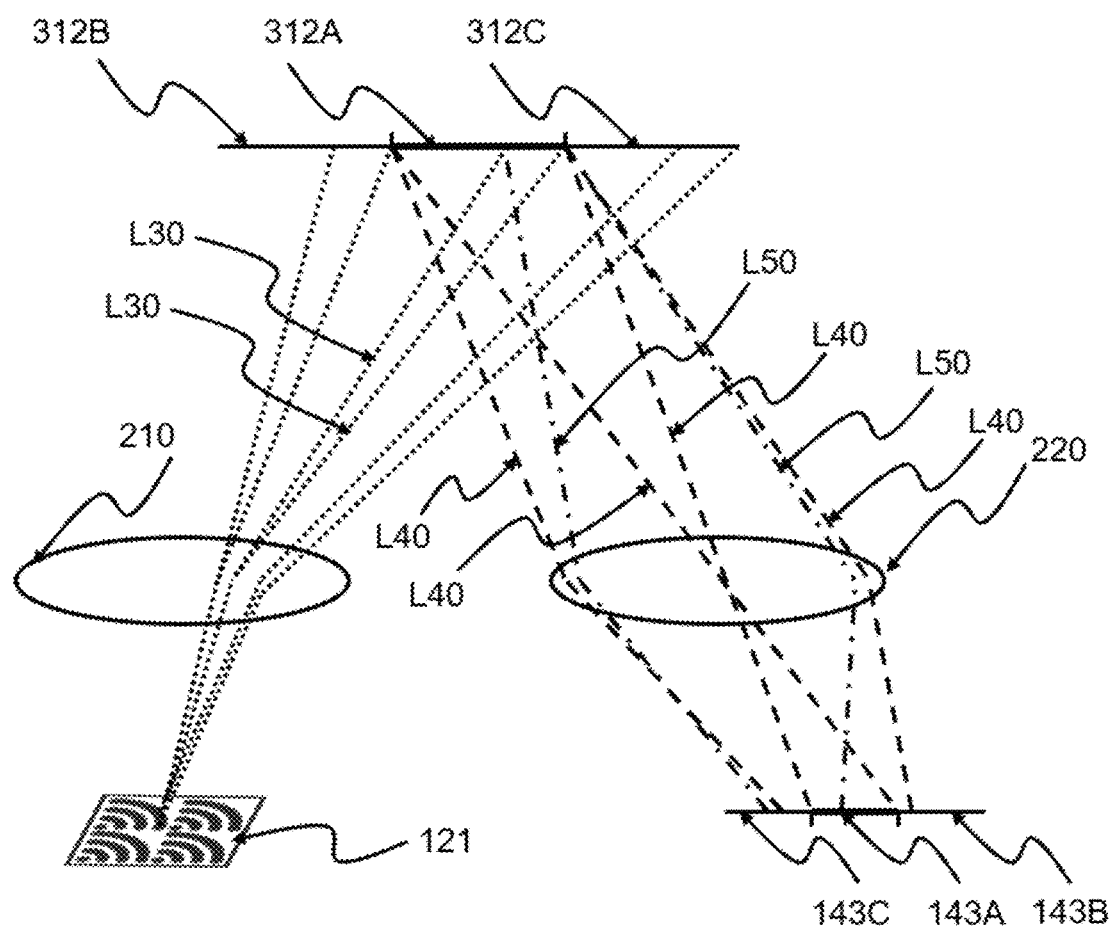

Another benefit or function of using such a method is to correct or minimize optical aberrations, as illustrated in FIGS. 4A and 4B. In FIGS. 4A and 4B, for simplicity, the pixel array and the corresponding scene region units imaged by these pixels are shown in 1D only, but the same method can be extended in 2D. In FIG. 4A, as the target scene region units move away from the imaging system's optical axis, the paraxial approximation becomes less accurate and optical aberrations becomes severe such that some reflected signal light (e.g. L40) of a scene region unit 312A is imaged outside the corresponding pixel 143A and into adjacent pixels 143B and 143C. This unwanted aberration causes inaccurate distance calculation of each pixel (e.g. 143A) in such case as it collects signal light from other scene region units (e.g. 312B and 312C) besides its designated one (e.g. 312A). Therefore, in a method according to a second embodiment, shown in FIG. 4A, the phase shifting and amplitude tuning elements 125 is adjusted to emit an array of beams (e.g. L30) that each illuminate only a center segment of the scene region unit (e.g. 312A) corresponding to a pixel (e.g. 143A). By properly designing the size and location of the illuminated center segment within the scene region unit (e.g. 312A), it can be ensured that the reflected signal light (e.g. L50) from this illuminated center segment is solely detected by the corresponding pixel (e.g. 143A). Similarly, the same process occurs simultaneous at the scene region unit imaged by every pixel that requires optical aberration correction.

This method eliminates the effect of optical aberrations, but it does not range the whole scene region units and leave some space unmeasured. To solve this problem, the array of the signal optical beams can be simultaneously rotated by adjusting the phase shifting and amplitude tuning elements 125 of the OPA 121 to illuminate another segment of each scene region unit as in an example shown in FIG. 4B. The new segment of the scene region unit 312A is within the area defined by optical beams L30 of FIG. 4B which has been rotated as compared to the positions in FIG. 4A. The new segment is an edge segment located at an edge of the scene region unit not covered by the center segment. The reflected signal light L50 from this segment may be detected by both pixel 143A and 143C due to optical aberrations. Equivalently, each pixel e.g. 143A detects reflected signal light from two edge segments of two adjacent scene region units e.g. 312A and 312C. Therefore the detected optical power of each pixel 143A is a linear combination of the optical power of the corresponding segments of scene region units 312A and 312C with known (by lens system calibration) coefficients as weights as shown in the equation below:

$$p_n = c_n s_n + c_{n+1} s_{n+1},$$

where $p_n$ is the received optical power at the nth sensor pixel, $s_n$ is the signal optical power intended to be obtained from the illuminated segment of the nth scene region unit corresponding to the nth pixel and $c_n$ is the weight coefficient of the nth scene region unit which represents the fraction of the optical power received by the nth pixel and which can be calculated from optical simulation or from system calibration with a known target scene.

By combining the depth calculation results of all pixels, the linear equation system can be solved to extract the depth value for the edge segment of each scene region unit. The linear equation system for a N-pixel system can be written as:

$$c_1 s_1 + c_2 s_2 = p_2$$
$$\ldots$$
$$c_{N-1} s_{N-1} + c_N s_N = p_{N-1},$$
$$c_N s_N = p_N$$

The Nth pixel can be a center pixel of the sensor pixel array and it can be assumed to have negligible optical aberrations so the reflected optical signal of only the segment of the Nth scene region unit is received. This linear system of equations can be easily solved to extract the aberration-corrected optical signal for each segment, which can then be used for depth (distance) calculation.

Similarly, other edge segments of the scene region unit, such as the edge segment located to the left of the center segment in FIG. 4A, can be sequentially illuminated, and with each illumination, the same data processing step described above is performed to calculate the depth, although the equations described above will be modified to account for the fact that the edge segment is adjacent to a different adjacent scene region unit (for example, 312B rather than 312C).

In two dimensions, an edge segment located in a corner of a scene region unit may contribute to the detected signal of two or three other pixels besides the pixel corresponding to the scene region unit. The linear equation system can be constructed correspondingly.

Figure 6:
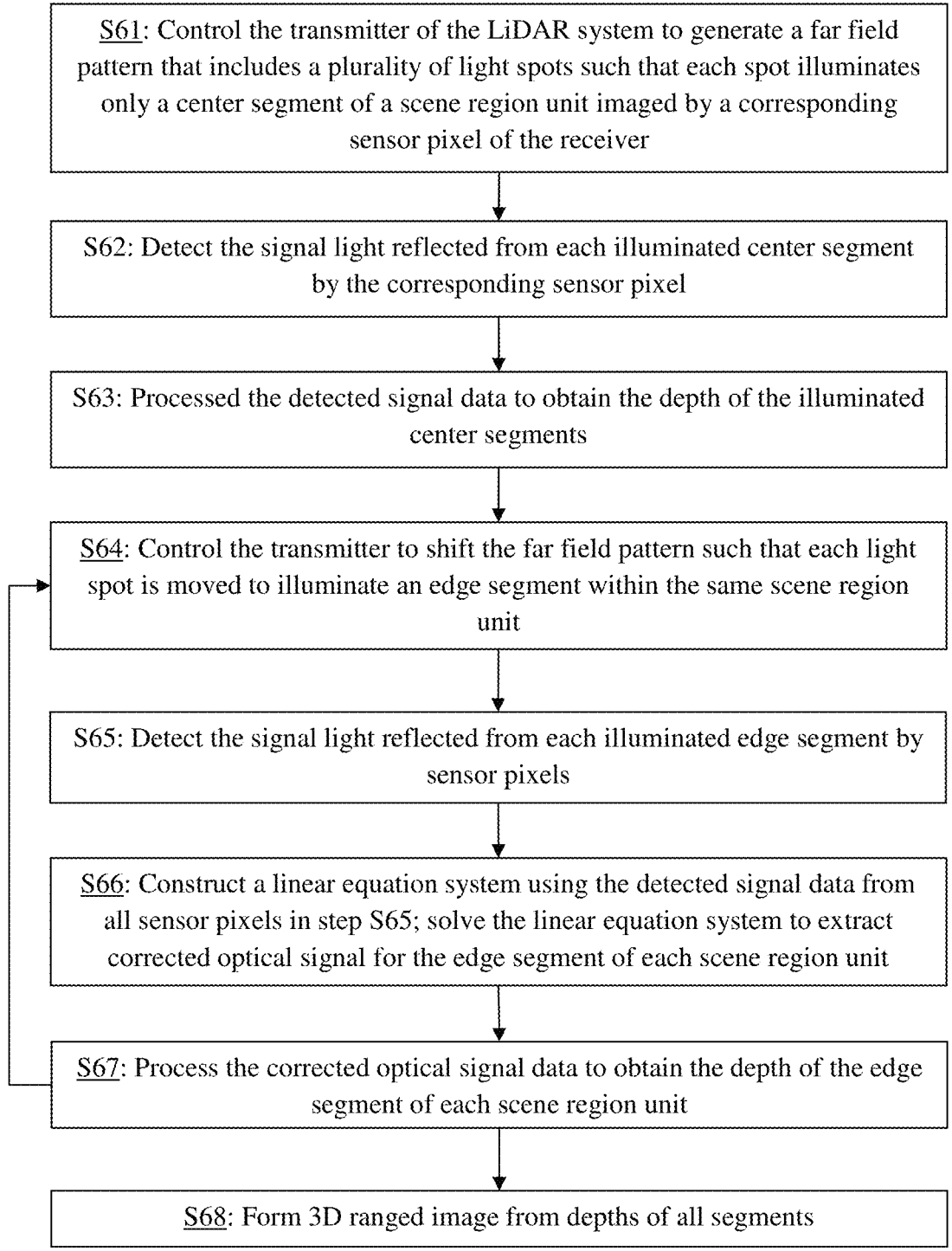
FIG. 6 schematically illustrates steps of a 3D range imaging method according to the second embodiment of the present invention.

To summarize, the method according to a second embodiment of the present invention includes the following steps (FIG. 6). First, the transmitter of the LiDAR system is controlled to generate a far field pattern that includes a plurality of light spots where each spot illuminates only a center segment of a scene region unit imaged by a corresponding sensor pixel of the receiver (step S61). The size and location of the center segment is designed such that despite the aberration of the optical system, the reflected light from the center segment falls solely on the corresponding sensor pixel. The signal light reflected from each illuminated center segment is detected by the corresponding sensor pixel (step S62). The detected signal data is processed to obtain the depth of the illuminated center segments (step S63).

Then, the transmitter of the LiDAR system is controlled to rotate the far field pattern where each light spot is moved to illuminate a first edge segment located at an edge of the same scene region unit (step S64). The reflected light falling on each sensor pixel is detected by the sensor pixel (step S65). In this step, the detected signal of each sensor pixel includes contributions from the corresponding scene region unit as well as one or more adjacent scene region units. The detected signal data from all sensor pixels in step S65 are used to construct a linear equation system, which is solved to extract the aberration-corrected optical signal for each first edge segment (step S66). The optical signal is then used to calculate the depth value for the first edge segment of each scene region unit (step S67). Steps S64 to S66 are repeated to obtain the depth value of additional edge segments within the scene region unit. The multiple illuminated segments (center segment, edge segments) within each scene region unit are preferably non-overlapping with each other, and collectively cover the entire scene region unit or a part of the scene region unit. The depth data generated by sequentially illuminating the multiple segments form a ranged image (step S68) which corrects for the optical aberration effect.

The methods of the first and second embodiments may be combined. For example, the transmitter may sequentially illuminate the four segments (four quadrants) of each scene region unit in a manner similar to the first embodiment shown in FIGS. 3B and 3C, and the read-out circuit of the receiver calculates the depth of each illuminated segment by taking into consideration the effect of optical aberration in a manner similar to the second embodiment described above.

Figure 7:
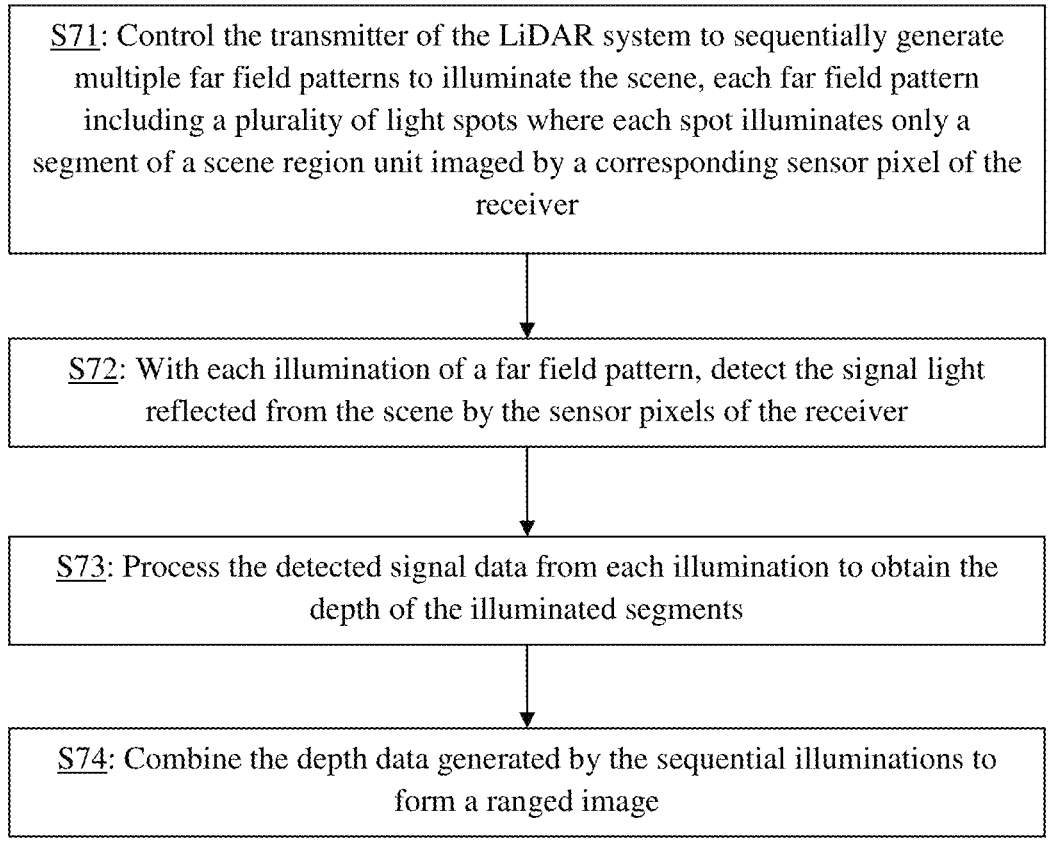
FIG. 7 schematically illustrates steps of a 3D range imaging method according to embodiments of the present invention.

More generally, embodiments of the present invention provide a 3D range imaging method that includes the following steps (FIG. 7). The transmitter of the LiDAR system is controlled to sequentially generate multiple far field patterns to illuminate the scene, each far field pattern including a plurality of light spots where each spot illuminates only a segment of a scene region unit imaged by a corresponding sensor pixel of the receiver (step S71). The multiple segments within each scene region unit illuminated in the multiple illuminations are non-overlapping with each other, and collectively cover the entire scene region unit or a part of the scene region unit. With each illumination of a far field pattern, the signal light reflected from the scene is detected by the sensor pixels of the receiver (step S72). The detected signal data from each illumination is processed to obtain the depth of the illuminated segments (step S73). This step may include constructing and solving a linear equation system as described earlier, if optical aberration is sufficiently significant. The depth data generated by the sequential illuminations are combined to form a ranged image (step S74).

The above described 3D range imaging methods are implemented by the control integrated circuits 122 which controls the phase shifting and amplitude tuning elements 125 and read-out integrated circuit 132 which processes the data obtained from the receiver 130 in the manner described above.

It will be apparent to those skilled in the art that various modification and variations can be made in the 3D range imaging method and related apparatus of the present invention without departing from the spirit or scope of the invention. Thus, it is intended that the present invention cover modifications and variations that come within the scope of the appended claims and their equivalents.

What is claimed is:

1. A method for three-dimension range imaging implemented in a light detection and ranging (LiDAR) system, the LiDAR system comprising a transmitter which includes an optical phased array device, a receiver which includes a photo sensor array having a plurality of pixels, and an optical system, wherein the transmitter is configured to emit light forming controllable far field patterns, wherein the optical system is configured to direct the light from the transmitter to a target scene and to image the target scene on the receiver, wherein the target scene is virtually divided into a plurality of scene region units each imaged by the optical system to one pixel of the photo sensor array, wherein the receiver further includes a read-out circuit configured to read out and process data generated by the photo sensor array, the method comprising:

(a) the transmitter of the LiDAR system generating a first far field pattern which includes a plurality of light spots each illuminating only a first segment within a scene region unit of the target scene;

(b) each pixel of the photo sensor array detecting reflected light from the first segment of the corresponding scene region unit of the target scene;

(c) the read-out circuit processing the detected signal data from each pixel to calculate a depth of the first segment of the corresponding scene region unit;

(d) thereafter, the transmitter of the LiDAR system generating an additional far field pattern which includes a plurality of light spots each illuminating only an additional segment within a scene region unit of the target scene, the additional segment being different from the first segment;

(e) each pixel of the photo sensor array detecting reflected light from the additional segment of the corresponding scene region unit of the target scene; and (f) the read-out circuit processing the detected signal data from each pixel to calculate a depth of the additional segment of the corresponding scene region unit.

2. The method of claim 1, further comprising:

repeating steps (d), (e) and (f) to sequentially calculate depths of multiple additional segments of each scene region unit, wherein the first segment and all additional segments within each scene region unit are non-overlapping with each other and collectively cover the scene region unit.

3. The method of claim 2, further comprising:

generating a ranged image of the target scene based on the calculated depths of all segments of all scene region units.

4. The method of claim 2, wherein each of the first segment and the additional segments covers one quadrant of the corresponding scene region unit.

5. The method of claim 1, wherein the transmitter further includes a light source, wherein the optical phased array device includes a plurality of antennas each configured to emit light forming far field pattern, a plurality of phase shifting and amplitude tuning elements each coupled to one antenna, and a plurality of optical splitters for splitting an input light from the light source to feed the antennas, and wherein the transmitter further including a control circuit coupled to the plurality of phase shifting and amplitude tuning elements, configured to adjust the plurality of phase shifting and amplitude tuning elements to change the far field pattern generated by the plurality of antennas.

6. The method of claim 1,
wherein the plurality of antennas includes one or more of: optical waveguide facets, grating couplers, reflectors, meta-surface couplers and holographic optical couplers;
wherein the plurality of optical splitters includes one or more of: Y-junctions, multi-mode interferometers, directional couplers, and thin-film semi-transparent reflectors; and
wherein the plurality of phase shifting and amplitude tuning elements employs one or more of: thermo-optic effect, electro-refractive effect, electro-absorption effect, free-carrier absorption effect, phase changing effect and liquid crystal actuation.

7. The method of claim 1, wherein the photo sensor array includes a 1D or 2D array of at least one photo sensitive pixels in a bare-die chip or a pre-packaged device.

8. A method for three-dimension range imaging implemented in a light detection and ranging (LiDAR) system, the LiDAR system comprising a transmitter which includes an optical phased array device, a receiver which includes a photo sensor array having a plurality of pixels, and an optical system, wherein the transmitter is configured to emit light forming controllable far field patterns, wherein the optical system is configured to direct the light from the transmitter to a target scene and to image the target scene on the receiver, wherein the target scene is virtually divided into a plurality of scene region units each imaged by the optical system to one pixel of the photo sensor array, wherein the receiver further includes a read-out circuit configured to read out and process data generated by the photo sensor array, the method comprising:
(a) the transmitter of the LiDAR system generating a first far field pattern which includes a plurality of light spots each illuminating only a center segment located within and near a center of a scene region unit of the target scene;
(b) each pixel of the photo sensor array detecting reflected light from the center segment of the corresponding scene region unit of the target scene;
(c) the read-out circuit processing the detected signal data from each pixel to calculate a depth of the center segment of the corresponding scene region unit;
(d) thereafter, the transmitter of the LiDAR system generating an additional far field pattern which includes a plurality of light spots each illuminating only an edge segment located within and at an edge of a scene region unit of the target scene, the edge segment being different from the center segment;
(e) the plurality of pixels of the photo sensor array detecting reflected light from the edge segments, the reflected light from the edge segment of each scene region unit being detected by the pixel corresponding to the scene region unit and an immediately adjacent pixel due to aberrations of the optical system; and
(f) the read-out circuit processing the detected signal data from all pixels to calculate a depth of the edge segment of each scene region unit.

9. The method of claim 8, wherein step (f) includes combining received signal power of all pixels to construct a linear equation system, solving the linear equation system to obtain an aberration-corrected signal data for each edge segment, and calculate a depth of each edge segment using the aberration-corrected signal data for the edge segment.

10. The method of claim 8, further comprising:
repeating steps (d), (e) and (f) to sequentially calculate depths of multiple additional segments of each scene region unit,
wherein the first segment and all additional segments within each scene region unit are non-overlapping with each other and collectively cover the scene region unit.

11. The method of claim 10, further comprising:
generating a ranged image of the target scene based on the calculated depths of all segments of all scene region units.

12. The method of claim 8,
wherein the transmitter further includes a light source,
wherein the optical phased array device includes a plurality of antennas each configured to emit light forming far field pattern, a plurality of phase shifting and amplitude tuning elements each coupled to one antenna, and a plurality of optical splitters for splitting an input light from the light source to feed the antennas, and
wherein the transmitter further including a control circuit coupled to the plurality of phase shifting and amplitude tuning elements, configured to adjust the plurality of phase shifting and amplitude tuning elements to change the far field pattern generated by the plurality of antennas.

13. The method of claim 8,
wherein the plurality of antennas includes one or more of: optical waveguide facets, grating couplers, reflectors, meta-surface couplers and holographic optical couplers;
wherein the plurality of optical splitters includes one or more of: Y-junctions, multi-mode interferometers, directional couplers, and thin-film semi-transparent reflectors; and
wherein the plurality of phase shifting and amplitude tuning elements employs one or more of: thermo-optic effect, electro-refractive effect, electro-absorption effect, free-carrier absorption effect, phase changing effect and liquid crystal actuation.

14. The method of claim 8, wherein the photo sensor array includes a 1D or 2D array of at least one photo sensitive pixels in a bare-die chip or a pre-packaged device.

15. A method for three-dimension range imaging implemented in a light detection and ranging (LiDAR) system, the LiDAR system comprising a transmitter which includes an optical phased array device, a receiver which includes a photo sensor array having a plurality of pixels, and an optical system, wherein the transmitter is configured to emit light forming controllable far field patterns, wherein the optical system is configured to direct the light from the transmitter to a target scene and to image the target scene on the receiver, wherein the target scene is virtually divided into a plurality of scene region units each imaged by the optical system to one pixel of the photo sensor array, wherein the receiver further includes a read-out circuit configured to read out and process data generated by the photo sensor array, the method comprising:
(a) the transmitter of the LiDAR system generating a far field pattern which includes a plurality of light spots each illuminating only a segment within a scene region unit of the target scene;
(b) the plurality of pixels of the photo sensor array detecting reflected light from the illuminated segments, the reflected light from the edge segment of each scene region unit being detected by at least the pixel corresponding to the scene region unit;

(c) the read-out circuit processing the detected signal data from all pixels to calculate a depth of the illuminated segment of each scene region unit;

(d) repeating steps (a), (b) and (c) one or more times, each time to illuminate an additional segment within each scene region unit and to calculate a depth of the illuminated additional segment, wherein all segments within each scene region unit are non-overlapping with each other and collectively cover the scene region unit; and (e) generating a ranged image of the target scene based on the calculated depths of all segments of all scene region units.

16. The method of claim 15, wherein in some repetitions, step (c) includes combining received signal power of all pixels to construct a linear equation system, solving the linear equation system to obtain an aberration-corrected signal data for each segment, and calculate a depth of each segment using the aberration-corrected signal data for the segment.

17. The method of claim 15,
wherein the transmitter further includes a light source,
wherein the optical phased array device includes a plurality of antennas each configured to emit light forming far field pattern, a plurality of phase shifting and amplitude tuning elements each coupled to one antenna, and a plurality of optical splitters for splitting an input light from the light source to feed the antennas, and
wherein the transmitter further including a control circuit coupled to the plurality of phase shifting and amplitude tuning elements, configured to adjust the plurality of phase shifting and amplitude tuning elements to change the far field pattern generated by the plurality of antennas.

18. The method of claim 15,
wherein the plurality of antennas includes one or more of: optical waveguide facets, grating couplers, reflectors, meta-surface couplers and holographic optical couplers;
wherein the plurality of optical splitters includes one or more of: Y-junctions, multi-mode interferometers, directional couplers, and thin-film semi-transparent reflectors; and
wherein the plurality of phase shifting and amplitude tuning elements employs one or more of: thermo-optic effect, electro-refractive effect, electro-absorption effect, free-carrier absorption effect, phase changing effect and liquid crystal actuation.

19. The method of claim 15, wherein the photo sensor array includes a 1D or 2D array of at least one photo sensitive pixels in a bare-die chip or a pre-packaged device.

* * * * *